(12) United States Patent
Wang

(10) Patent No.: US 11,225,276 B2
(45) Date of Patent: Jan. 18, 2022

(54) FOLDING STRUCTURE ROLLING BAG

(71) Applicant: Eurmax Canopy Inc, El Monte, CA (US)

(72) Inventor: Weigang Wang, El Monte, CA (US)

( * ) Notice: Subject to any disclaimer, the term of this patent is extended or adjusted under 35 U.S.C. 154(b) by 343 days.

(21) Appl. No.: 16/385,352

(22) Filed: Apr. 16, 2019

(65) Prior Publication Data

US 2020/0331507 A1    Oct. 22, 2020

(51) Int. Cl.
| | |
|---|---|
| *B62B 1/12* | (2006.01) |
| *B65D 33/10* | (2006.01) |
| *A45C 3/00* | (2006.01) |
| *B65D 33/25* | (2006.01) |
| *B62B 1/26* | (2006.01) |

(52) U.S. Cl.
CPC ............... *B62B 1/12* (2013.01); *A45C 3/00* (2013.01); *B65D 33/105* (2013.01); *B65D 33/2589* (2020.05); *A45C 2003/008* (2013.01); *B62B 1/262* (2013.01)

(58) Field of Classification Search
CPC ....... B62B 1/12; B62B 2203/44; B62B 1/262; B65D 33/2591; B65D 33/105
See application file for complete search history.

(56) References Cited

U.S. PATENT DOCUMENTS

| | | | |
|---|---|---|---|
| 616,443 A | 12/1898 | Anderson | |
| 3,316,951 A * | 5/1967 | Jacobson | A63B 55/406 206/315.3 |
| 3,530,919 A * | 9/1970 | Albertg | A63B 55/40 206/315.4 |
| 4,593,541 A | 6/1986 | Lange | |
| 4,657,135 A * | 4/1987 | Kjose | A63B 55/00 206/315.3 |
| 4,951,818 A * | 8/1990 | Johnson | A45C 5/14 190/107 |
| 5,220,950 A * | 6/1993 | Cordasco | A63B 55/406 150/159 |
| 5,265,894 A * | 11/1993 | Dunn | A63B 55/60 280/47.26 |
| 5,402,883 A * | 4/1995 | Shin | A63B 55/408 206/315.3 |
| 5,515,897 A * | 5/1996 | Fehan | A63B 55/408 150/159 |
| D402,458 S * | 12/1998 | Brooks | D3/201 |

(Continued)

FOREIGN PATENT DOCUMENTS

| | | | | |
|---|---|---|---|---|
| EP | 1426265 A2 * | 6/2004 | ........... | B62B 5/0083 |
| EP | 2221229 A1 * | 8/2010 | ............... | B62B 1/14 |
| WO | WO-0208043 A1 * | 1/2002 | ........... | B62B 5/0083 |

*Primary Examiner* — Jacob B Meyer
(74) *Attorney, Agent, or Firm* — Clement Cheng

(57) ABSTRACT

A folding structure rolling bag has a bag portion. The bag is not rigid and a lengthwise zipper opens along a length of the bag portion. The folding structure rolling bag also has a frame portion. The frame is rigid and includes a right wheel axle holding a right wheel and a left wheel axle holding a left wheel. The frame portion includes a vertical frame portion and a horizontal frame portion. The vertical frame portion extends no more than a quarter of a length of the bag portion. The frame portion is an aluminum extrusion. The lengthwise zipper extends from a rear bag opening to a front cover, and the front cover is configured to cover a folding structure.

6 Claims, 9 Drawing Sheets

(56) References Cited

U.S. PATENT DOCUMENTS

| | | | | |
|---|---|---|---|---|
| 5,975,170 A * | 11/1999 | Anguiano | A63B 55/406 | 150/159 |
| 6,039,243 A * | 3/2000 | Lickton | A45C 7/0036 | 229/117.01 |
| 6,161,698 A * | 12/2000 | Bradshaw | A63B 55/408 | 206/527 |
| 6,164,425 A * | 12/2000 | Latshaw | A45C 5/14 | 190/108 |
| 6,279,926 B1 * | 8/2001 | Taube | B62B 5/0083 | 280/37 |
| 6,315,115 B1 * | 11/2001 | Bradshaw | A63B 60/62 | 206/315.4 |
| 6,330,944 B1 * | 12/2001 | DeMichele | A63B 55/406 | 206/315.3 |
| 6,401,890 B1 * | 6/2002 | Tan | A45C 5/14 | 150/159 |
| 6,439,585 B1 * | 8/2002 | Tan | B62B 1/266 | 280/47.26 |
| 6,447,002 B1 * | 9/2002 | Fang | A45C 13/385 | 280/47.29 |
| 6,513,816 B1 * | 2/2003 | Kijima | A63B 55/60 | 280/47.26 |
| 6,520,327 B1 * | 2/2003 | Boardman | A45C 13/002 | 206/315.4 |
| 6,557,702 B1 * | 5/2003 | Sanderson | A45C 5/02 | 206/315.4 |
| 6,763,940 B1 * | 7/2004 | Lai | A45C 13/04 | 206/315.1 |
| 6,892,773 B1 * | 5/2005 | Wenzler | A63B 55/406 | 150/159 |
| 6,901,979 B1 * | 6/2005 | Herold | A63B 55/406 | 150/159 |
| 7,077,252 B2 * | 7/2006 | Sanchez | A45C 7/0045 | 150/159 |
| 7,111,851 B2 * | 9/2006 | Duncan | A45C 13/385 | 280/47.131 |
| 7,188,714 B1 * | 3/2007 | Herold | A63B 55/60 | 190/18 A |
| 7,229,081 B2 * | 6/2007 | Stockler | B62B 1/14 | 280/47.24 |
| 7,424,950 B2 * | 9/2008 | Burgess | A63B 60/64 | 206/315.3 |
| 7,735,643 B2 * | 6/2010 | Sanches | A45C 13/021 | 206/315.3 |
| 8,146,927 B2 * | 4/2012 | Maccario | B62B 3/106 | 280/47.26 |
| 8,794,409 B2 * | 8/2014 | Klevana | A63B 71/0036 | 190/18 A |
| D729,519 S * | 5/2015 | Clough | D3/279 | |
| 9,744,425 B2 * | 8/2017 | Klevana | A63B 71/0036 | |
| 10,159,318 B2 * | 12/2018 | McGuire | A45C 7/0036 | |
| 10,479,593 B2 * | 11/2019 | Oh | B65D 85/07 | |
| 2002/0074754 A1 * | 6/2002 | Tan | B62B 5/0083 | 280/47.26 |
| 2002/0190490 A1 * | 12/2002 | Yang | A45C 5/14 | 280/47.131 |
| 2003/0209396 A1 * | 11/2003 | Bernbaun | A45C 7/0054 | 190/18 A |
| 2004/0045780 A1 * | 3/2004 | Bernbaum | A45C 5/14 | 190/109 |
| 2604/0065513 | 4/2004 | Hoberman | | |
| 2004/0255938 A1 * | 12/2004 | Shragge | B62B 1/125 | 128/201.27 |
| 2005/0077133 A1 * | 4/2005 | Cassegrain | A45C 7/0036 | 190/18 A |
| 2006/0071435 A1 * | 4/2006 | Zwack | B63C 11/02 | 280/47.27 |
| 2006/0175782 A1 * | 8/2006 | Shin | B62B 1/262 | 280/47.26 |
| 2010/0237576 A1 * | 9/2010 | Maccario | B62B 3/106 | 280/47.26 |
| 2011/0083933 A1 * | 4/2011 | Engel | A45C 7/0077 | 190/18 A |
| 2013/0015030 A1 * | 1/2013 | Klevana | A45C 5/14 | 190/18 A |
| 2014/0367213 A1 * | 12/2014 | Klevana | A45C 5/14 | 190/115 |
| 2016/0206060 A1 * | 7/2016 | McGuire | A45C 7/0036 | |
| 2017/0232985 A1 * | 8/2017 | Hendricks | A45C 13/02 | 206/423 |
| 2019/0045895 A1 * | 2/2019 | McGuire | A45C 7/0036 | |
| 2019/0289970 A1 * | 9/2019 | McGuire | A45C 7/0063 | |
| 2019/0337546 A1 * | 11/2019 | Burpee | E04H 15/32 | |
| 2020/0331507 A1 * | 10/2020 | Wang | B65D 33/2591 | |
| 2021/0015230 A1 * | 1/2021 | Fitzgerald | A45C 13/385 | |

* cited by examiner

FOLDING STRUCTURE ROLLING BAG

FIELD OF THE INVENTION

The present invention is in the field of a folding structure rolling bag, namely a canopy carrier.

DISCUSSION OF RELATED ART

A variety of interesting rolling carrier bags that have been made in the prior art, for example as seen in inventor's Gustave Anderson U.S. Pat. No. 616,443 filed Jan. 31, 1898 and issued Dec. 27, 1898, entitled Combined Bag-Holder and Truck, the disclosure of which is incorporated herein by reference. Anderson described a combined bag-holder and truck as its principal object to provide an improved bag holder and support having wheels, whereby it is adapted also for use as a truck for conveying the loaded bag from the filling-point to the point of deposit, this being accomplished without removing the bag from its support until deposited. In United States patent publication 2004/0065518 by inventor Barry Hoberman, issued Apr. 8, 2004, an article of luggage, such as a rolling duffel, includes a base, opposing ends connected to the base and opposing sides connected to the base and the opposing ends. Also, in United States patent application publication 2011/0083933, issued Apr. 14, 2011 by inventor Christopher Engel, entitled Travel Bag Having Collapsible End Wall, the disclosure of which is included herein by reference, the inventor provides a back wall and a foldable end wall, to facilitate compact storage when not in use.

SUMMARY OF THE INVENTION

A folding structure rolling bag has a bag portion. The bag is not rigid and a lengthwise zipper opens along a length of the bag portion. The folding structure rolling bag also has a frame portion. The frame is rigid and includes a right wheel axle holding a right wheel and a left wheel axle holding a left wheel. The frame portion includes a vertical frame portion and a horizontal frame portion. The vertical frame portion extends no more than a quarter of a length of the bag portion. The frame portion is an aluminum extrusion. The lengthwise zipper extends from a rear bag opening to a front cover, and the front cover is configured to cover a folding structure.

The frame portion also has a socket channel extending along the vertical frame portion. The socket channel includes a right axle socket for receiving the right wheel axle, and a left axle socket for receiving the left wheel axle. The folding frame portion may also have an inside corner formed at a right angle and configured to receive a footpad bottom edge of a folding structure. The bag portion has an inside strap mounted to a top panel inside surface, and the bag portion also has an outside strap mounted to an outside surface of the top panel. The outside strap wraps over the lengthwise zipper when the outside strap is in a closed position. The length of horizontal frame member is greater than twice the height of vertical frame member.

The following call out list of elements can be a useful guide in referencing the elements of the drawings.

10 Carrier
11 Top Panel
12 Right Panel
13 Front Panel
14 Right Zipper Panel Edge
15 Top Zipper Panel Edge
16 Front Handle
17 Rear Handle
18 Bottom Panel
19 Front Cover
20 Bag Portion
21 Lengthwise Zipper
22 Zipper Pull
24 Outside Closure Strap
25 Outside Closure Connection
26 Inside Strap Laminate Portion
27 Inside Strap Extension
28 Inside Strap Connector
29 Inside Strap Receiver
30 Frame Portion
31 Right Wheel
32 Right Wheel Axle
132 Threading Portion
33 Horizontal Frame Portion
34 Vertical Frame Portion
35 Left Wheel
36 Left Wheel Axle
37 Left Axle Socket
38 Right Axle Socket
39 Inside Corner
41 Large Pouch
42 Small Pouch
43 Large Pouch Flap
44 Small Pouch Opening
45 Top Panel Inside Surface
46 Left Panel
47 Left Panel Inside Surface
48 Bottom Panel Inside Surface
49 Right Panel Inside Surface
50 Inside Tightening Nut
53 Bag Interface
54 Socket Channel
55 Socket Channel Connectors
56 Frame Portion Lower Corner
57 Horizontal Frame Portion Top Edge
58 Rear Bag Opening
59 Vertical Frame Portion Upper Edge 60 Folding Structure
61 Folding Structure Legs
62 Folding Structure Footpad
63 Folding Structure Connection
64 Folding Structure Middle Joint
65 Folding Structure Upper Joint
66 Footpad Bottom Edge
67 Had Connector
68 Distal Pad Corner
69 Pad Latch
71 Outside Closure Strap Extension
72 Outside Tightening Nut
88 Length Of Horizontal Frame Member
89 Height Of Vertical Frame Member

DETAILED DESCRIPTION OF THE PREFERRED EMBODIMENT

Figure 1:
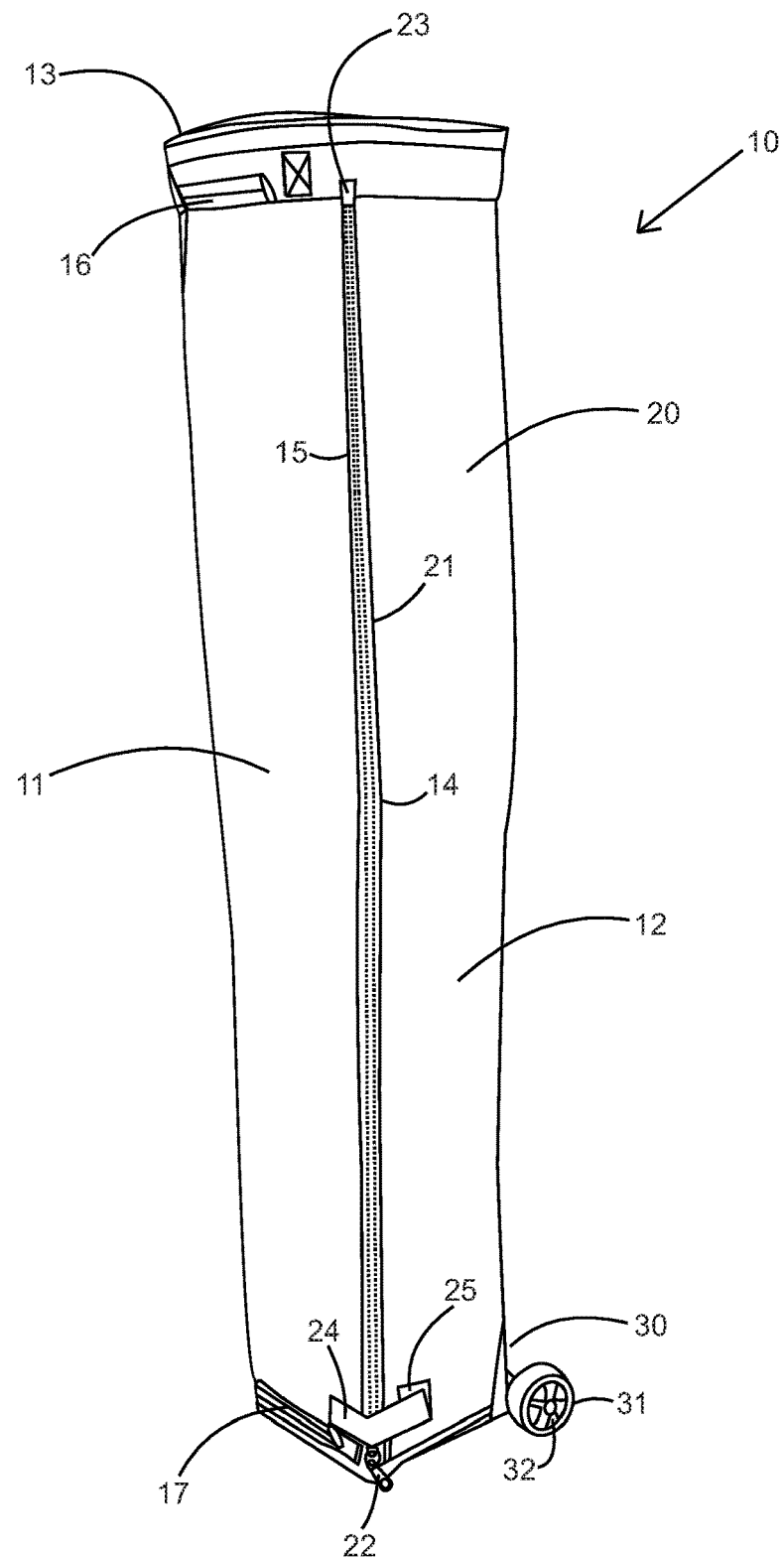
FIG. 1 is a perspective view of the canopy bag carrier with a one-sided zipper.

As seen in FIG. 1, the present invention is a rolling bag adapted for carrying a folding frame such as the folding frame of a folding canopy. The carrier 10 has a bag portion 20 and a frame portion 30. The bag portion 20 has a lengthwise zipper 21. The lengthwise zipper 21 passes between a top panel 11 and a right panel 12, or a left panel. The lengthwise zipper 21 attaches to the top panel 11 at the top zipper panel edge 15 and can attached to the right panel 12 at a right zipper panel edge 14. The lengthwise zipper 21 extends from a rear portion of the carrier 10 to a front portion of the carrier. The lengthwise zipper 21 terminates at a zipper end 23.

The bag portion 20 has a top panel 11, a right panel 12, and a front panel 13. The front handle 16 can be placed on the top panel 11, or the front panel 13. The rear handle 17 can be placed on the top panel 11. The zipper is reinforced by an outside closure strap 24 that engages to an outside closure connection 25. The outside closure strap 24 can be attached to the rear portion of the top handle 11, and the outside closure connection can be attached to the rear portion of the right panel 12. The outside closure strap 24 can be formed of a hook and loop strap and the outside closure connection 25 can be formed as a strap buckle or hook and loop connector for example.

Figure 2:
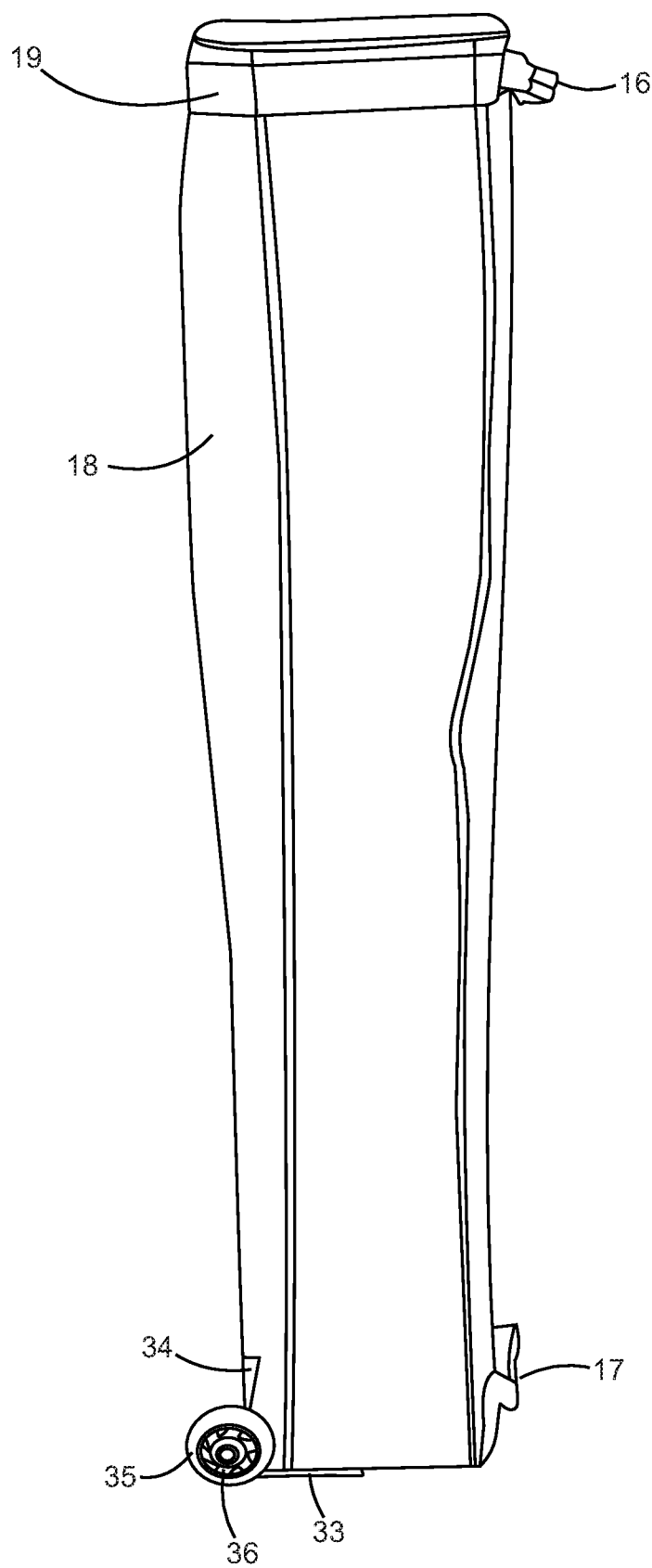
FIG. 2 is a right side view of the present invention showing the right profile portion of the vertical shaped bag.

As seen in FIG. 2, the frame portion 30 has a pair of wheels including a right wheel 31 that is mounted on a right wheel axle 32. The frame portion includes a vertical frame portion 34 and a horizontal frame portion 33. The vertical frame portion 34 has a socket for receiving the left wheel axle 36 upon which the left wheel 35 can be mounted. The right wheel axle 32 can also be mounted on the socket. The bottom panel 18 is preferably parallel to the vertical frame portion 34. The bottom panel 18 is a fabric flexible sheet and operates in tension against the vertical frame portion 34. The top panel 11, right panel 12, left panel, and bottom panel 18 are all flexible sheets operating in tension. The front cover 19 covers the top portion of the bag portion 20. The front panel 13 is bounded in its periphery by the front cover 19.

Figure 3:
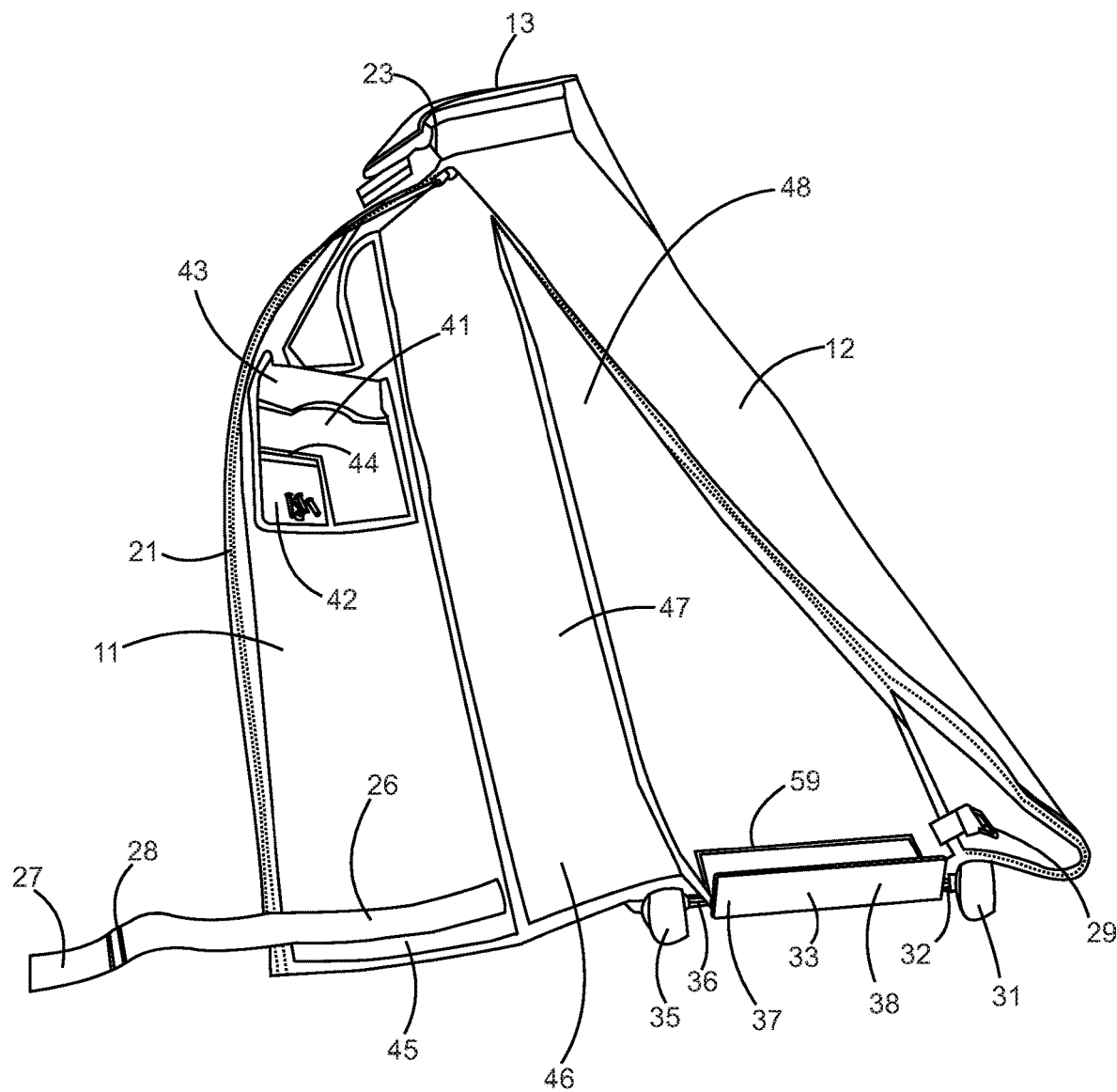
FIG. 3 is an exploded view assembly diagram showing the inside of the bag that shows that there are different compartments inside the bag.

As seen in FIG. 3, the frame portion 30 includes a right axle socket 38 and a left axle socket 37. The right axle socket 38 receives the right wheel axle 32, and the left axle socket 37 receives the left wheel axle 36. The bottom panel 18 has a bottom panel inside surface 48 just as the left panel 46 has a left panel inside surface 47. The right panel 12 has a right panel inside surface and the top panel 11 has a top panel inside surface 45. The rectangular prism shaped bag conforms to the shape of the folding frame.

A pouch system for holding articles such as small parts can be located on the top panel inside surface 45. For example, the small pouch 42 can have a small pouch opening 44 for access. The large pouch 41 has a large pouch flap 43 2 allow access. The small pouch 42 can be mounted to the external surface of the large pouch 41.

The top panel 11 can have an inside strap connector 28 which is formed as a fabric strip such as a nylon webbing strip. The inside strap connector 28 includes an inside strap laminate portion 26 which is stitched to the top panel 11. The inside strap extension 27 wraps over the canopy frame and attaches to an inside strap receiver 29 which can be formed as a buckle or hook and loop tape connection. Preferably, a metal loop buckle is used. The metal loop buckle is preferably attached to the bottom panel inside surface 48.

The vertical frame portion 34 has a vertical frame portion upper edge 59 which defines an upper edge of the vertical frame portion where the vertical frame portion 34 meets the bottom panel inside surface 48. The vertical frame portion 34 is rigid, and the bottom panel inside surface 48 is not rigid.

Figure 4:
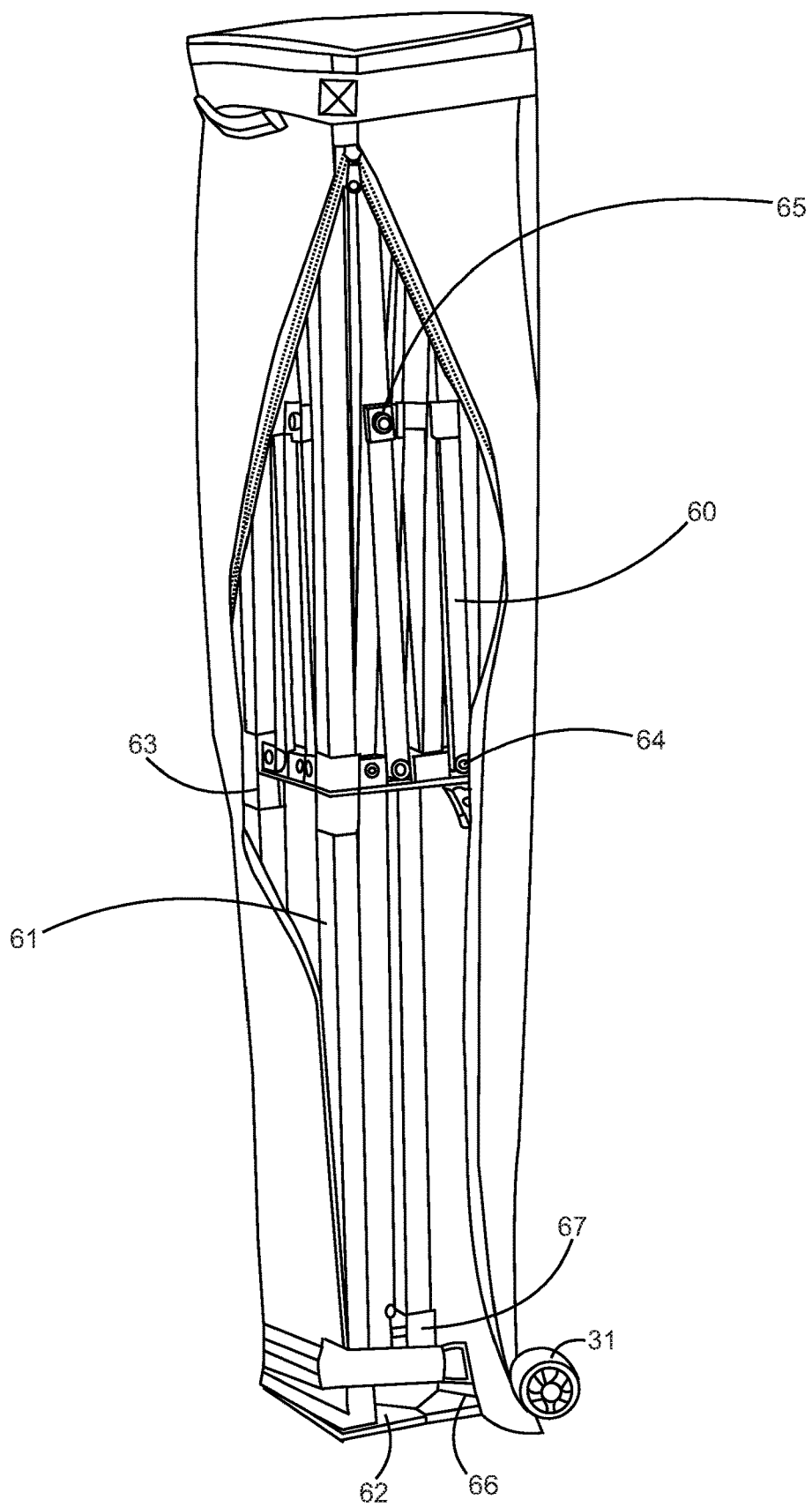
FIG. 4 is an assembly diagram showing the bag being slightly opened with the canopy inside.

As seen in FIG. 4, the folding structure 60 can be placed within the bag portion 20 with the folding structure footpads 62 on the horizontal frame portion 33. If the horizontal frame portion 33, and the vertical frame portion 34 are made of a single aluminum extrusion, then the rigid relationship between the horizontal frame portion 33 and the vertical frame portion 34 can provide a support for the folding structure footpads 62. The folding structure footpads 62 are preferably flat footpads that can abut the horizontal frame portion 33. The folding structure footpads 62 can be connected to the folding structure 60 by pad connectors 67. The pad connectors 67 connect the folding structure footpads 62 to the folding structure legs 61. The folding structure legs 61 are connected to folding structure connectors 63. The folding structure 60 has folding structure middle joints 64 and folding structure upper joints 65. The folding joints and members allow the folding structure to unfold to an expanded position from the stowed position shown in the figures.

Figure 5:
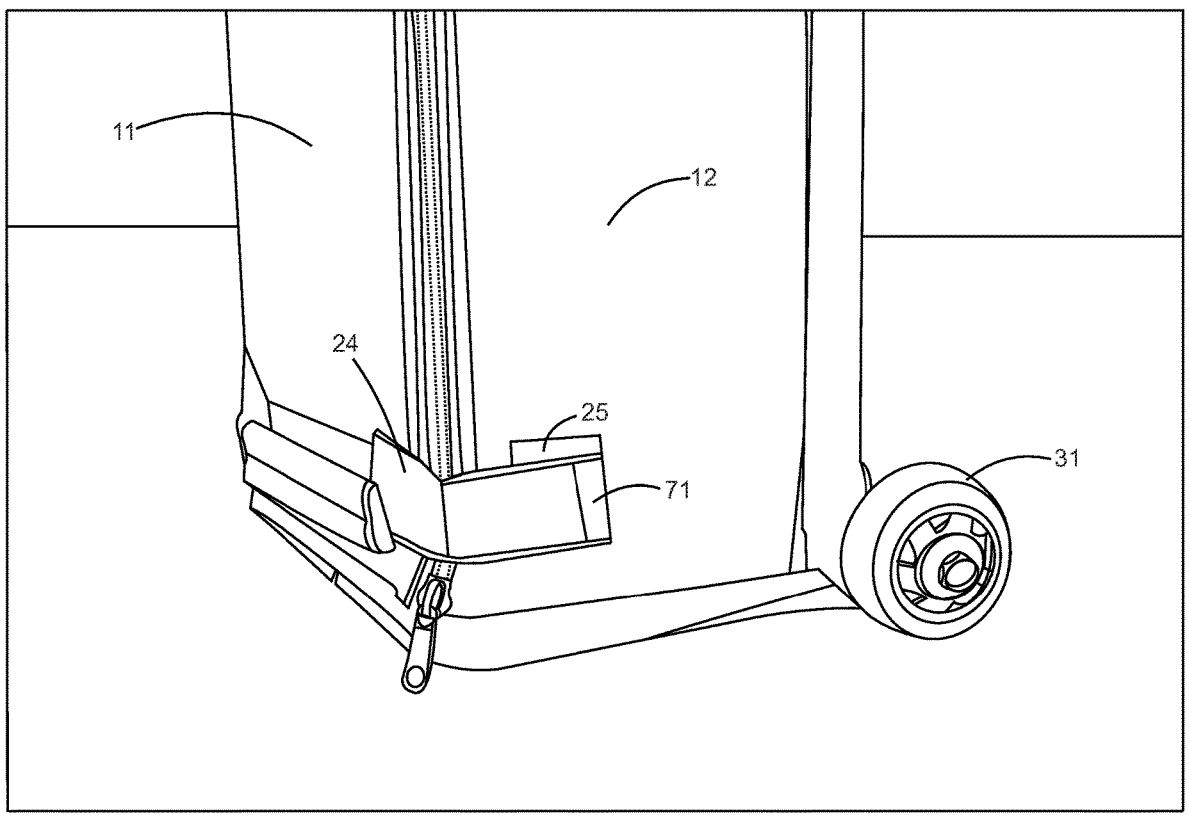
FIG. 5 is a view of the bottom left side view of the bag that shows that there's a strap and zipper that holds the bag with the canopy inside in place.

As seen in FIG. 5, the outside closure strap extension 71 overlies the outside surface of the right panel 12, when the outside closure strap is in a closed position. The outside closure strap extension connects to the outside closure connection 25 that is mounted on the outside surface of the right panel 12.

Figure 6:
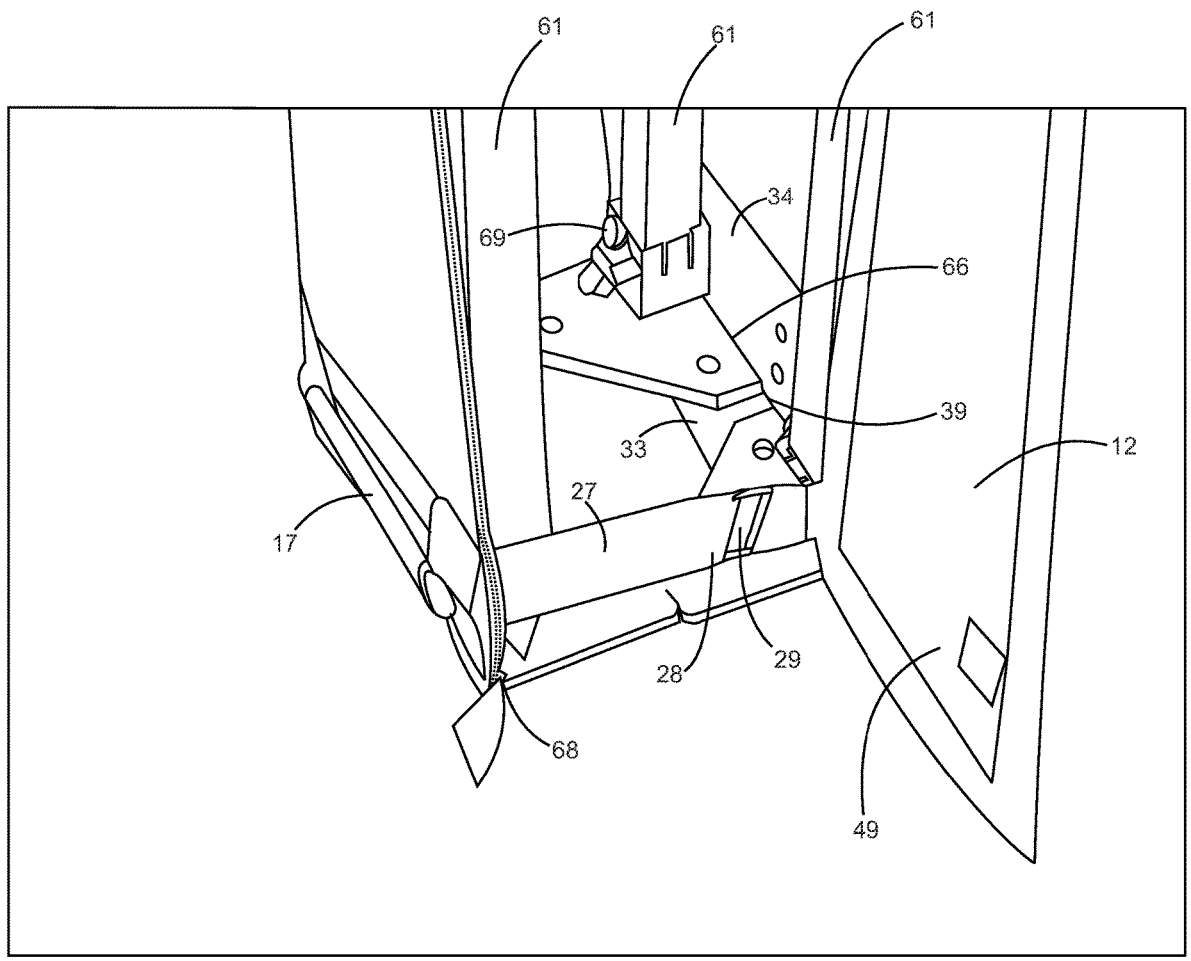
FIG. 6 is an exploded view diagram showing the inside bottom view of the bag, which shows the amount of space there is with the strap being attached and the flap being opened.

As seen in FIG. 6, the footpad of the folding structure has a footpad bottom edge 66 that has a rectangular profile that lodges in the inside corner 39 formed between the vertical frame portion 34 and the horizontal frame portion 33. The footpad can have a pad latch 69 that allows adjustment or detachment of the footpad. The footpad preferably also includes a distal pad corner 68. A square configured canopy preferably has a total of four footpads. The right panel inside surface 49 can fold away from the distal pad corner 68 of the folding frame when the zipper is opened.

Figure 7:
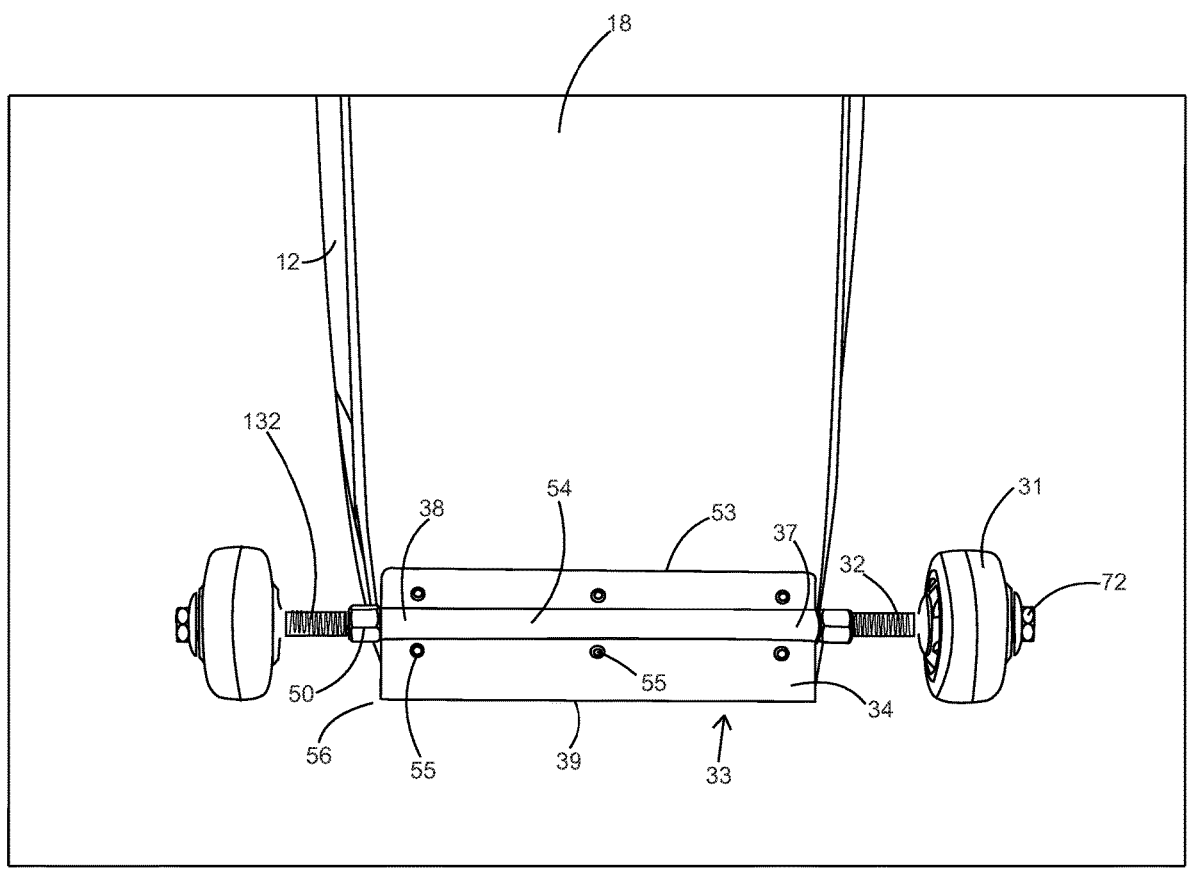
FIG. 7 is a back bottom view of the bag which has a metal plating that is tucked and has two wheels attached on each end.

As seen in FIG. 7, the vertical frame portion 34 has an external surface with a bag interface 53 where the soft portion of the bag meets the rigid portion of the frame. The socket channel 54 is preferably integrally formed to the vertical frame portion 34 such as by selecting an aluminum extrusion having a channel 54. The socket channel 54 is connected to the bag at the socket channel connectors 55 which can be rivets, screws or the like. The vertical frame portion 34 has a frame portion lower corner 56. The wheels can be attached by an inside tightening nut and an outside tightening nut 74. The tightening nuts to cure the threading portion 132 of the right wheel axle 32 and the left wheel axle 36 to the frame 30.

Figure 8:
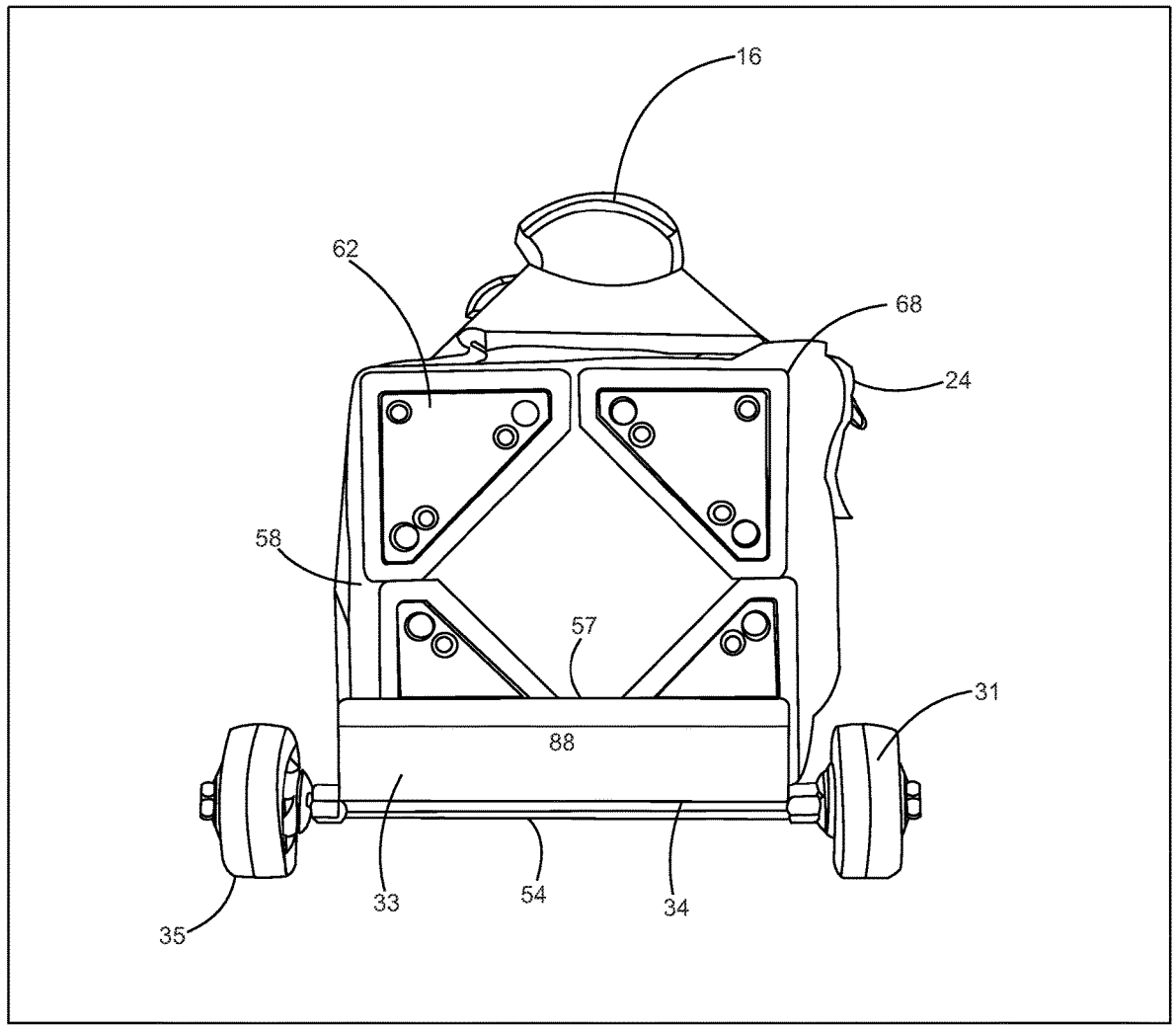
FIG. 8 is a bottom view of the assembled invention.
Figure 9:
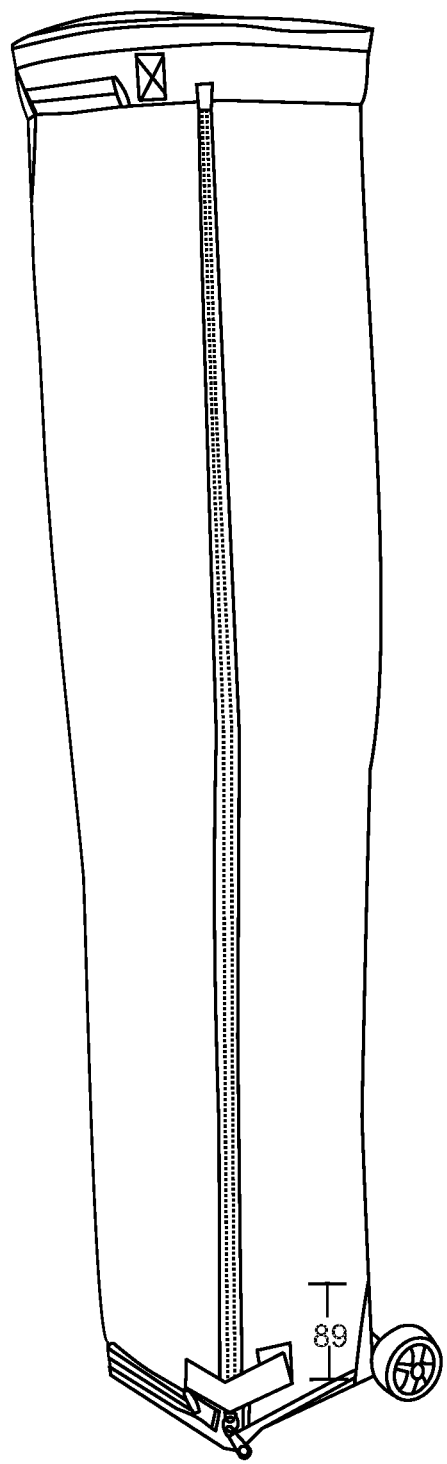
FIG. 9 is a view of the canopy bag carrier in upright configuration.

As seen in FIG. 8, the bag portion 20 has a rear bag opening 58 exposing the folding structure footpads 62 of the folding structure 60. The horizontal frame portion has a horizontal frame portion top edge 57.

It is interesting to note that the soft structure of the bag lacks rigid, so cannot easily be wheeled around without the rigid structure of the folding structure 60. Thus, the bag 20 relies on the folding structure 60 to provide rigidity. In turn, the folding structure 60 relies on the bag 20 for covering, wheels, and carry handles.

The height of the vertical frame member 89 is very short in proportion to the length of the horizontal frame member 88. The length of horizontal frame member 88 is greater than the height of vertical frame member 89. The length of horizontal frame member 88 can be greater than twice the height of vertical frame member 89. The length of horizontal frame member 88 is preferably greater than four times the height of vertical frame member 89.

The invention claimed is:

1. A folding structure and rolling bag system comprising:
   a bag portion, wherein the bag portion is not rigid, wherein the bag portion includes a top panel, right panel, a left panel, and a bottom panel;
   a lengthwise zipper opening along a length of the bag portion;
   a frame portion, wherein the frame is rigid and includes a right wheel axle holding a right wheel and a left wheel axle holding a left wheel, wherein the frame portion includes a vertical frame portion and a horizontal frame portion, wherein the vertical frame portion extends no more than a quarter of a length of the bag portion, and wherein a bag interface is formed between the vertical frame portion and the bottom panel of the bag portion;
   a rear bag opening, wherein the lengthwise zipper extends from the rear bag opening to a front cover, wherein the front cover is configured to cover a folding structure;
   a length of the horizontal frame portion that is greater than four times a height of the vertical frame portion;
   a folding structure having folding structure footpads held within the bag portion and on the horizontal frame portion, wherein the horizontal frame portion, and the vertical frame portion are made of a single aluminum extrusion with a rigid relationship between the horizontal frame portion and the vertical frame portion that provides a support for the folding structure footpads, wherein the folding structure footpads are flat footpads that abut the horizontal frame portion; and
   pad connectors connecting the folding structure footpads to the folding structure, wherein the pad connectors connect the folding structure footpads to folding structure legs, wherein the folding structure legs are connected to folding structure connectors including folding structure middle joints and folding structure upper joints, wherein folding joints and members allow the folding structure to unfold to an expanded position from the stowed position.

2. The folding structure and rolling bag system of claim 1, further including a pouch system located on the top panel inside surface for holding articles, wherein the pouch system further includes a small pouch having a small pouch opening and a large pouch with a large pouch flap, wherein the small pouch is mounted to the external surface of the large pouch.

3. The folding structure and rolling bag system of claim 1, wherein the frame portion is an aluminum extrusion, wherein the lengthwise zipper extends from a rear bag opening to a front cover, wherein the front cover is configured to cover the folding structure, wherein the frame portion further includes a socket channel extending along the vertical frame portion, wherein the socket channel includes a right axle socket for receiving the right wheel axle, and a left axle socket for receiving the left wheel axle, wherein the frame portion further includes an inside corner formed at a right angle and configured to receive a footpad bottom edge of a folding structure.

4. The folding structure and rolling bag system of claim 1, wherein the bag portion has an inside strap mounted to a top panel inside surface, and wherein the bag portion also has an outside strap mounted to an outside surface of the top panel, wherein the outside strap wraps over the lengthwise zipper when the outside strap is in a closed position, wherein the outside strap wraps over the inside strap.

5. The folding structure and rolling bag system of claim 1, further including an outside closure strap having an outside closure strap extension that overlies an outside surface of the right panel, wherein when the outside closure strap is in a closed position the outside closure strap extension connects to an outside closure connection that is mounted on an outside surface of the right panel, wherein the outside closure strap extension overlies the outside surface of the right panel when the outside closure strap is in a closed position, wherein the outside closure strap extension connects to the outside closure connection mounted on the outside surface of the right panel.

6. The folding structure and rolling bag system of claim 1, wherein the top panel has an inside strap connector which is formed as a fabric strip, wherein the inside strap connector includes an inside strap laminate portion which is stitched to the top panel, wherein the inside strap extension wraps over the canopy frame and attaches to an inside strap receiver.

* * * * *